United States Patent
Corr et al.

(10) Patent No.: US 8,600,798 B1
(45) Date of Patent: Dec. 3, 2013

(54) LOAN SCREENING

(75) Inventors: Jonathan Corr, Danville, CA (US); Limin Hu, Fremont, CA (US); Richard E. Roof, Danville, CA (US); Ting-Hu Wu, Fremont, CA (US)

(73) Assignee: Ellie Mae, Inc., Pleasanton, CA (US)

( * ) Notice: Subject to any disclaimer, the term of this patent is extended or adjusted under 35 U.S.C. 154(b) by 864 days.

(21) Appl. No.: 11/859,426

(22) Filed: Sep. 21, 2007

(51) Int. Cl.
   *G06Q 10/00* (2012.01)

(52) U.S. Cl.
   USPC .................. 705/7.38; 705/7.11; 705/7.28

(58) Field of Classification Search
   USPC ............................................. 705/38
   See application file for complete search history.

(56) References Cited

U.S. PATENT DOCUMENTS

| | | | |
|---|---|---|---|
| 5,091,868 A | 2/1992 | Pickens et al. | |
| 5,111,185 A | 5/1992 | Kozaki | |
| 5,144,693 A | 9/1992 | Morgan | |
| 5,148,520 A | 9/1992 | Morgan | |
| 5,191,525 A | 3/1993 | LeBrun et al. | |
| 5,226,137 A | 7/1993 | Bolan et al. | |
| 5,438,657 A | 8/1995 | Nakatani | |
| 5,581,700 A | 12/1996 | Witte | |
| 5,611,052 A | 3/1997 | Dykstra et al. | |
| 5,699,527 A * | 12/1997 | Davidson | 705/38 |
| 5,704,029 A | 12/1997 | Wright, Jr. | |
| 5,734,898 A | 3/1998 | He | |
| 5,752,042 A | 5/1998 | Cole et al. | |
| 5,765,144 A | 6/1998 | Larche et al. | |
| 5,768,510 A | 6/1998 | Gish | |
| 5,774,551 A | 6/1998 | Wu et al. | |
| 5,812,764 A | 9/1998 | Heinz, Sr. | |
| 5,913,029 A * | 6/1999 | Shostak | 709/203 |
| 5,919,247 A | 7/1999 | Van Hoff et al. | |
| 5,940,812 A | 8/1999 | Tengel et al. | |
| 5,963,952 A | 10/1999 | Smith | |
| 5,995,947 A | 11/1999 | Fraser et al. | |
| 5,995,985 A | 11/1999 | Cai | |
| 6,000,033 A | 12/1999 | Kelley et al. | |
| 6,006,242 A | 12/1999 | Poole et al. | |
| 6,006,334 A | 12/1999 | Nguyen et al. | |
| 6,023,714 A | 2/2000 | Hill et al. | |
| 6,029,149 A | 2/2000 | Dykstra et al. | |
| 6,078,403 A | 6/2000 | Palmer | |
| 6,081,893 A | 6/2000 | Grawrock et al. | |
| 6,088,700 A | 7/2000 | Larsen et al. | |
| 6,088,796 A | 7/2000 | Cianfrocca et al. | |
| 6,092,121 A | 7/2000 | Bennett et al. | |
| 6,101,510 A | 8/2000 | Stone et al. | |

(Continued)

FOREIGN PATENT DOCUMENTS

WO    WO 00/21011    4/2000

OTHER PUBLICATIONS

Byte User Guide. Version 4.8, CBC Companies: Nov. 2003.*
http://www.elliemae.com/ellie-mae-breaks-ground-with-dynamic-loan-screening-the-industrys-first-loan-matching-system/ May 21, 2007.*
http://www.ifap.ed.gov/dpcletters/doc0350_bodyoftext.htm. Mar. 1, 1998.*
Contour Software, Inc.—The Loan Closer for Windows—Version 4.0 (1984-1998).

(Continued)

*Primary Examiner* — Jason Dunham
*Assistant Examiner* — Richard Scheunemann
(74) *Attorney, Agent, or Firm* — Fish & Richardson P.C.

(57) ABSTRACT

A loan screening system and methods are described. One method includes monitoring loan application data as it is entered into a client application, extracting loan application data from the monitored data in accordance with a first predetermined criteria, matching the extracted data against supplier products and displaying one or more of the matching supplier products within a client application interface.

22 Claims, 9 Drawing Sheets

(56) References Cited

U.S. PATENT DOCUMENTS

| | | | |
|---|---|---|---|
| 6,104,394 A | 8/2000 | Lisle et al. | |
| 6,128,602 A | 10/2000 | Northington et al. | |
| 6,154,751 A | 11/2000 | Ault et al. | |
| 6,157,953 A | 12/2000 | Chang et al. | |
| 6,175,926 B1 | 1/2001 | Fogle | |
| 6,202,206 B1 | 3/2001 | Dean et al. | |
| 6,208,979 B1 | 3/2001 | Sinclair | |
| 6,209,095 B1 | 3/2001 | Anderson et al. | |
| 6,226,623 B1 | 5/2001 | Schein et al. | |
| 6,233,566 B1 | 5/2001 | Levine et al. | |
| 6,233,582 B1 | 5/2001 | Traversat et al. | |
| 6,266,716 B1 | 7/2001 | Wilson et al. | |
| 6,282,658 B2 | 8/2001 | French et al. | |
| 6,321,339 B1 | 11/2001 | French et al. | |
| 6,324,524 B1 | 11/2001 | Lent et al. | |
| 6,324,648 B1 | 11/2001 | Grantges, Jr. | |
| 6,336,124 B1 | 1/2002 | Alam et al. | |
| 6,338,064 B1 | 1/2002 | Ault et al. | |
| 6,339,828 B1 | 1/2002 | Grawrock et al. | |
| 6,341,351 B1 | 1/2002 | Muralidhran et al. | |
| 6,351,776 B1 | 2/2002 | O'Brien et al. | |
| 6,363,391 B1 | 3/2002 | Rosensteel, Jr. | |
| 6,366,912 B1 | 4/2002 | Wallent et al. | |
| 6,385,655 B1 | 5/2002 | Smith et al. | |
| 6,397,337 B1 | 5/2002 | Garrett et al. | |
| 6,418,448 B1 | 7/2002 | Sarkar | |
| 6,424,968 B1 | 7/2002 | Broster et al. | |
| 6,438,526 B1 | 8/2002 | Dykes et al. | |
| 6,446,141 B1 | 9/2002 | Nolan et al. | |
| 6,469,714 B2 | 10/2002 | Buxton et al. | |
| 6,473,892 B1 | 10/2002 | Porter | |
| 6,476,828 B1 | 11/2002 | Burkett et al. | |
| 6,476,833 B1 | 11/2002 | Moshfeghi | |
| 6,477,537 B2 | 11/2002 | Gustman | |
| 6,493,871 B1 | 12/2002 | McGuire et al. | |
| 6,496,936 B1 | 12/2002 | French et al. | |
| 6,504,554 B1 | 1/2003 | Stone et al. | |
| 6,538,669 B1 | 3/2003 | Lagueux, Jr. et al. | |
| 6,553,408 B1 | 4/2003 | Merrell et al. | |
| 6,608,634 B1 | 8/2003 | Sherrard et al. | |
| 6,611,816 B2 * | 8/2003 | Lebda et al. | 705/38 |
| 6,615,405 B1 | 9/2003 | Goldman et al. | |
| 6,640,278 B1 | 10/2003 | Nolan et al. | |
| 6,662,340 B2 | 12/2003 | Rawat et al. | |
| 6,851,087 B1 | 2/2005 | Sibert | |
| 6,859,878 B1 | 2/2005 | Kerr et al. | |
| 6,904,412 B1 | 6/2005 | Broadbent et al. | |
| 6,920,434 B1 | 7/2005 | Cossette | |
| 6,947,943 B2 | 9/2005 | DeAnna et al. | |
| 7,058,971 B1 | 6/2006 | Horikiri | |
| 7,103,650 B1 | 9/2006 | Vetrivelkumaran et al. | |
| 7,155,490 B1 | 12/2006 | Malmer et al. | |
| 7,165,250 B2 | 1/2007 | Lyons | |
| 7,185,333 B1 | 2/2007 | Shafron | |
| 7,263,663 B2 | 8/2007 | Ballard et al. | |
| 7,340,714 B2 | 3/2008 | Upton | |
| 7,379,965 B2 | 5/2008 | Sherwood et al. | |
| 2001/0010046 A1 | 7/2001 | Muyres et al. | |
| 2001/0011246 A1 | 8/2001 | Tammaro | |
| 2001/0029482 A1 | 10/2001 | Tealdi et al. | |
| 2001/0032178 A1 | 10/2001 | Adams et al. | |
| 2001/0037288 A1 | 11/2001 | Bennett et al. | |
| 2001/0039516 A1 | 11/2001 | Bennett et al. | |
| 2001/0047307 A1 | 11/2001 | Bennett et al. | |
| 2001/0047326 A1 | 11/2001 | Broadbent et al. | |
| 2001/0049653 A1 | 12/2001 | Sheets | |
| 2002/0019804 A1 | 2/2002 | Sutton | |
| 2002/0029188 A1 | 3/2002 | Schmid | |
| 2002/0059137 A1 | 5/2002 | Freeman et al. | |
| 2002/0065879 A1 | 5/2002 | Ambrose et al. | |
| 2002/0138414 A1 | 9/2002 | Baker, IV | |
| 2002/0188941 A1 | 12/2002 | Cicciarelli et al. | |
| 2002/0194219 A1 | 12/2002 | Bradley et al. | |
| 2003/0033241 A1 | 2/2003 | Harari | |
| 2003/0046586 A1 | 3/2003 | Bheemarasetti et al. | |
| 2003/0061398 A1 | 3/2003 | Wilson et al. | |
| 2003/0065614 A1 * | 4/2003 | Sweeney | 705/38 |
| 2003/0066065 A1 | 4/2003 | Larkin | |
| 2003/0159136 A1 | 8/2003 | Huang et al. | |
| 2003/0163598 A1 | 8/2003 | Wilson et al. | |
| 2003/0184585 A1 | 10/2003 | Xu | |
| 2003/0210428 A1 | 11/2003 | Bevlin et al. | |
| 2003/0229581 A1 | 12/2003 | Green et al. | |
| 2003/0233316 A1 | 12/2003 | Hu et al. | |
| 2004/0019558 A1 | 1/2004 | McDonald et al. | |
| 2004/0034592 A1 | 2/2004 | Hu et al. | |
| 2004/0088700 A1 | 5/2004 | Lee et al. | |
| 2004/0138996 A1 | 7/2004 | Bettenburg et al. | |
| 2004/0225596 A1 | 11/2004 | Kemper et al. | |
| 2005/0172271 A1 | 8/2005 | Spertus et al. | |
| 2005/0235202 A1 | 10/2005 | Chen et al. | |
| 2005/0278249 A1 | 12/2005 | Jones et al. | |
| 2005/0289046 A1 | 12/2005 | Conyack, Jr. | |
| 2006/0005036 A1 | 1/2006 | Hu et al. | |
| 2006/0075070 A1 | 4/2006 | Merissert-Coffinieres et al. | |
| 2006/0101453 A1 | 5/2006 | Burkhart et al. | |
| 2006/0155639 A1 | 7/2006 | Lynch et al. | |
| 2006/0178983 A1 | 8/2006 | Nice et al. | |
| 2006/0184452 A1 | 8/2006 | Barnes et al. | |
| 2006/0248003 A1 | 11/2006 | Basin et al. | |

OTHER PUBLICATIONS

Contour Software, Inc.—The Loan Handler—Version 5.0 (1984-2001).
Ilium Software eWallet Users Guide and Reference Version 4.0 by Ilium Software, Inc. © 1997-2006.
Calyx Software, "Point for Windows Version 3.x Interface Development Guide," Nov. 29, 1999, pp. 1-21.
Calyx Software, "Point for Windows Version 3.x Interface Marketing Guide," Dec. 8, 1999, pp. 1-5.
LOS Documentation—Genesis (2001).
LOS Documentation—Calyx (Revised Aug. 2002).
Calyx Point—Getting Started (2002).
Calyx Point—Point User Guide (Revised May 2002).
LOS Documentation—Byte (2003).
Calyx Point—Point User Guide (Revised Oct. 2003).
Calyx Point and PointMan—Getting Started (Updated May 2003).
Calyx Point and PointMan—Getting Started (Updated Oct. 2003).
LOS Documentation—Genesis (2003).
Understanding Client-Server Applications, Parts I and II, zone.ni.com, Feb. 19, 2004.
A Gentle Introduction to SGML, isgmlug.org, Apr. 14, 2004.
Overview of SGML Resources, W3.org., Apr. 14, 2004.
Application Service Provider, Webopedia, May 6, 2004.
How ASPs Work, howstuffworks.com, Jul. 1, 2004.
Defining an Internet ASP, howstuffworks.com, Jul. 1, 2004.
Examples of ASPs, howstuffworks.com, Jul. 1, 2004.
How ASPs Work, Things to Ask a Prospective ASP, howstuffworks.com, Jul. 1, 2004.
User's Guide to Gator eWallet Version 7.x, published by Gain Publishing (no publication date known).
Using MS Message Queue Triggers, Bradley Holland, consulting.dthomas.co.uk, date unknown.
Mguill, "Genesis 2000 TechNet" Internet Publication, (Online) Jan. 28, 2003. Retrieved from the Internet: URL:http://www.genesis2000.com/support/index3.asp.
Calyx Point—Getting Started (Updated Aug. 2002).
Gator eWallet—The Smart Online Companion, Feb. 24, 2006 (2 pages). Retrieved from the Internet: URL:http://www.gator.com/home2.html.
Gator eWallet—Frequently Asked Questions, Feb. 24, 2006 (11 pages). Retrieved from the Internet: URL:http://www.gator.com/help/gatorfaq.html.
Point Installation (PN 801000-000737) (2 pages).

\* cited by examiner

LOAN SCREENING

FIELD OF THE INVENTION

This present invention relates generally to matching products and services with qualified consumers.

BACKGROUND OF THE INVENTION

Loan borrowers present their service providers with unique marketing challenges and business issues. In a typical loan procurement scenario, a prospective borrower will approach a loan broker to find an appropriate loan. While some borrowers may be able to approach a bank or lender directly, it is more common for a borrower to work with a broker or loan originator who can present the borrower with a wide set of loan offers, products and services. The entire process for procuring a loan from a lender for a borrower is called loan origination.

In order to match the prospective borrower with relevant loan offers and promotions, the loan broker will take application information from the borrower and fill out the loan application. While historically this work was done on paper, recent advances in technology have made online and software-based applications commonplace. A loan brokerage service will typically use one of the many loan origination software (LOS) systems that are available to facilitate the information retrieval. Such LOS systems include Encompass®, Genesis 2000®, Contour The Loan Handler®, Calyx, and Byte. Encompass®, Genesis 2000® and Contour The Loan Handler® are trademarked products of the assignee of this application, EllieMae, Inc.

Once an application is filled out, the loan broker then has the task of finding relevant promotional offers, products and services ("loan products") that best match the borrower. This process is often slow, laborious and inaccurate, as the broker may not have access to all of the best and most updated loan products. Lenders and suppliers of loan products and services constantly generate new products for potential borrowers, and it may be difficult for a loan originator to keep track of all of these changes.

SUMMARY OF THE INVENTION

In general terms, a real-time targeted loan screening service and method are disclosed that enables loan suppliers to quickly and efficiently deliver highly relevant products to a loan originator's LOS system to enhance the borrower's experience. The systems and methods facilitate contact between the loan originator and the loan supplier, without involving direct interaction with the borrower. An example loan screening system includes two modules: a first and second loan screening module. The example system also includes two databases: a supplier requirements database and a supplier products database. These databases can be part of either the first or second module, can exist separately as two databases, or can be combined into one database. The databases may be remote or local, and in addition, the databases may be distributed. Further, in some implementations where a distributed database remote from loan screening software system is used, those individual databases may be maintained by third parties and the loan screening software system may be configured to scan entries in those databases for matches.

In one implementation, the loan originator or broker, typically using a proprietary or commercially available LOS program, will have an integrated copy of the first loan screening module already installed on their computer. Once the loan originator begins filling out certain key fields in the loan application, or makes certain requests for a potential borrower, the system will activate or otherwise invoke the first loan screening module and begin the loan screening process. It will be appreciated that the first screening process can also operate on loan origination software systems that are entirely server based, accessible through a network, or distributed across more than one computer.

Once the loan screening begins, the loan screening software system's first module monitors the fields entered into the application. At a certain pre-determined point, the loan screening service's first module will transmit information to wherever the second module resides, e.g., remotely on a server or locally on the client. This second module uses data from the application to match the potential borrower against a stored database of supplier products. The supplier products database can be stored on the client computer as part of the loan screening system, or may be accessed over a network. This database will have information on products such as loans, offers or promotions. The data from the first module can also be augmented with other information to create an enhanced data set, which may reveal or target more or different promotional offers available to the borrower.

A second loan screening module uses the transmitted loan application data to match against a stored database of supplier requirements, which may also be kept on a client computer, on a server, or may be part of any of the two loan screening modules. Once a set of relevant loan products is found, information about these products can be transmitted back to the LOS software interface where the loan originator is located. It will be appreciated that some loan products may automatically be selected for transmission, rather than having the borrower meet certain requirements. Once the products appear in the LOS interface, the originator will then be able to work with the borrower to select the best product for the borrower's needs. The transmitted result can also contain additional details that may aid the borrower's decision. For example, if the loan product requires dynamic pricing, the system can enable the originator to request such information, which will be presented within the LOS interface.

After the borrower determines which loan product fits best, the originator will be able to use the system to select the product from within the LOS interface. The system can enable the LOS to communicate directly with the supplier of the relevant loan product, and the originator can "lock in" or apply for the desired loan.

Thus, instead of being limited to certain known loan products and services that may not be specifically tailored, updated or relevant to the borrower, the originator can present and give the borrower a wider array of specifically appropriate options. These options can be available in real time, and allow the borrower to make a more informed decision based upon his/her information and specified needs.

In one aspect a system is provided that includes an extraction module that monitors and extracts borrower application data as it is entered and a supplier requirements database stored in a memory device. The supplier requirements database contains information on pre-determined criteria to match against the extracted data. The system includes a supplier products database stored in a memory device. The supplier products database contains information on supplier products. The system also includes a product identifier that applies the pre-determined criteria from the supplier requirements database to the extracted data to identify one or more supplier products stored in the supplier products database.

Aspects of the invention can include none, one or more of the following features. The extraction module can monitor and extract borrower application data in real-time. The extraction module can be embedded in a client application that displays information generated by the product identifier within the client application's user interface. The extraction module can send data from the client application over an Internet, intranet or local area network. The extraction module and the product identifier can be resident on a single computer. The extraction module and the product identifier can be resident on a server, accessible through a network. Alternatively, the extraction module can reside on a client computer, the product identifier can reside on a server computer and the client computer and the server computer can be connected by a network. In yet another implementation, the extraction module can reside on a server computer, the product identifier can reside on a client computer and the client computer and the server computer can be connected by a network. The extraction module and the product identifier can reside on a client computer. The extraction module and the product identifier can reside on a server computer separate from a client computer that receives borrower application data.

The supplier can be selected from the group of suppliers consisting of lender, investor, settlement service provider, investment bank and a party interested in marketing products and services to borrowers. The supplier requirements database and the supplier products database can be a single database. The extraction module can further include an interface embedded within a client application that accesses at least one supplier's website and displays information from at least one supplier's website. The extraction module can include an interface embedded within a client application that accesses at least one supplier's website and permits selection of a product from at least one supplier's website. The supplier products database can further comprise information on one or more of aggregated loans, pooled-loan backed bonds, fixed-income investments or mortgage-backed securities.

In another aspect a method is provided that includes monitoring loan application data as it is entered into a client application, extracting loan application data from the monitored data in accordance with a first pre-determined criteria, matching the extracted data against supplier products and displaying one or more of matching supplier products within a client application interface.

Aspects of the invention can realize none, one or more of the following advantages. A loan screening system can be provided that is capable of real-time, automatic monitoring and evaluation of prospective borrowers. The system can match those borrowers with relevant loan products upon entering a pre-determined minimum amount of information into either a LOS system located locally, remotely, or on some website-based LOS system. A LOS system is provided that is capable of screening loan application data in real-time against pre-determined criteria associated with particular loan products. Once a loan application meets the pre-determined criteria, a system can be provided that quickly returns highly relevant loan products to the LOS system, without any additional proactive intervention by the operator.

The system can monitor the LOS system in real time, and deliver relevant programs directly to the LOS system without the need to work with additional software or outside resources. The system would not necessarily need to be coupled to a LOS program on a client computer, or a lender database on a server. The system may be separated into modules that can reside either entirely on the client computer, entirely on a server, accessible through a network connection, or some combination of all three. The added efficiency and convenience of such a system can generate positive goodwill between the borrower and the loan origination service, which can lead to better communication and improved customer relations for the loan origination service, the lenders and the borrower. Additionally, the added flexibility of such a system can ease deployment and adoption of the invention by current loan origination services.

These and other aspects are discussed below with reference to the drawings.

BRIEF DESCRIPTION OF THE DRAWINGS

The present invention is illustrated by way of example and not limitation in the Figures of the accompanying drawings, in which like references indicate similar elements, and in which:

FIG. 3 is an example screen shot of a loan application interface;

FIG. 9 is an example screen shot showing a lender website.

DETAILED DESCRIPTION

An integrated real-time loan screening software system and methods are disclosed. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

Aspects of the present invention may be implemented on one or more computers executing software instructions. According to one embodiment of the present invention, server and client computer systems transmit and receive data over a computer network and/or a fiber or copper-based telecommunications network. The steps of accessing, downloading, and manipulating the data, as well as other aspects of the present invention can be implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the CPU may directly support the downloaded instructions. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers. In some instances, the client and server functionality may be implemented on a single computer platform.

Aspects of the present invention can be used in a distributed electronic commerce application that includes a client/server network system that links one or more server computers to one or more client computers, as well as server computers to other server computers and client computers to other client computers. The client and server computers may be implemented as desktop personal computers, workstation computers, mobile computers, portable computing devices, personal digital assistant (PDA) devices, cellular telephones, digital audio or video playback devices, set top boxes, mobile devices, other electronic devices or any other similar type of device. For purposes of the following description, the terms "network," "computer network," and "online" may be used interchangeably and do not imply a particular network embodiment or topography. In general, any type of network (e.g., LAN, WAN, or Internet) may be used to implement an online or computer networked implementation of the system and methods.

Figure 1:
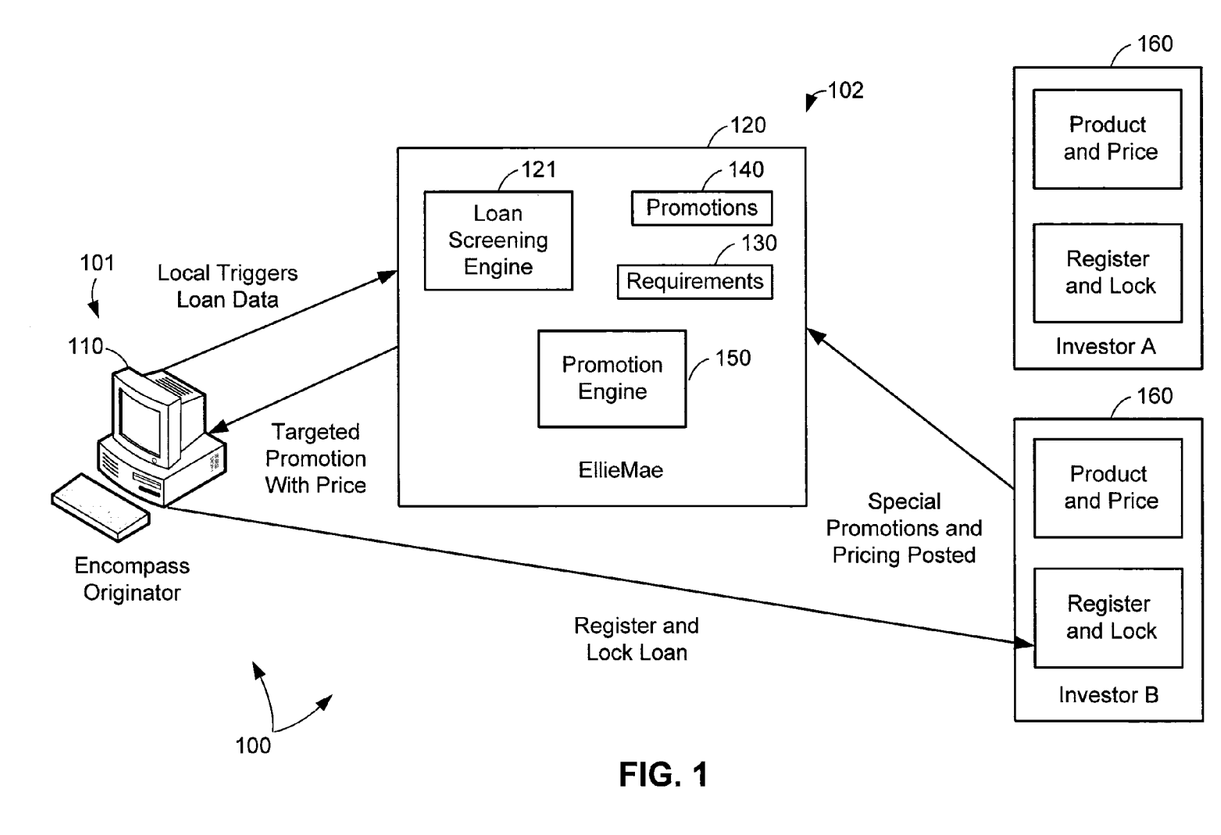
FIG. 1 illustrates an example network that implements an example loan screening system.

FIG. 1 shows an example of a loan screening system 100 that includes two modules: first and second screening modules 101 and 102, respectively. In one implementation, the first loan screening module 101 resides on a client computer 110, and can be integrated as part of an existing loan origination system software ("LOS") program. Alternatively, the first loan screening module can be downloaded from another location, such as, e.g., a server computer, and installed on the client's computer to work with any type of LOS, including desktop, web-based, web-enabled or ASP. In another implementation, the LOS program applies the first loan screening module over a network connection, where either the LOS program or the first module is server-based. In one implementation, once the client computer 110 has opted into the loan screening service, the system can become part of, and works in conjunction with the client computer LOS.

For purposes of the present discussion, a loan originator is any person or entity that helps to procure a loan on behalf of a borrower, and can include loan brokers, loan officers, loan processors, correspondent brokers, small banks that provide brokerage services, and any other similar type of loan procurement company or personnel. As used herein, the term "loan broker" is used to represent any such type of loan originator. Also for purposes of the present invention, LOS refers to any loan origination software system or program used by a loan origination or loan brokerage service to collect and store a borrower's loan application data and personal information, including reports and documents from other sources, such as, e.g., credit reports, title searches, disclosure statements, etc.

As shown in FIG. 1, the second loan screening module 102 includes a server component 120. Server component 120 includes a loan screening engine 121, a supplier requirements database 130, a supplier products database 140 and an promotion engine 150. Associated with the second screening module 102 are one or more loan originators 160 that provide requirements and promotions data to the second loan screening module 102. The operation of the various components is discussed in greater detail below.

Figure 2:
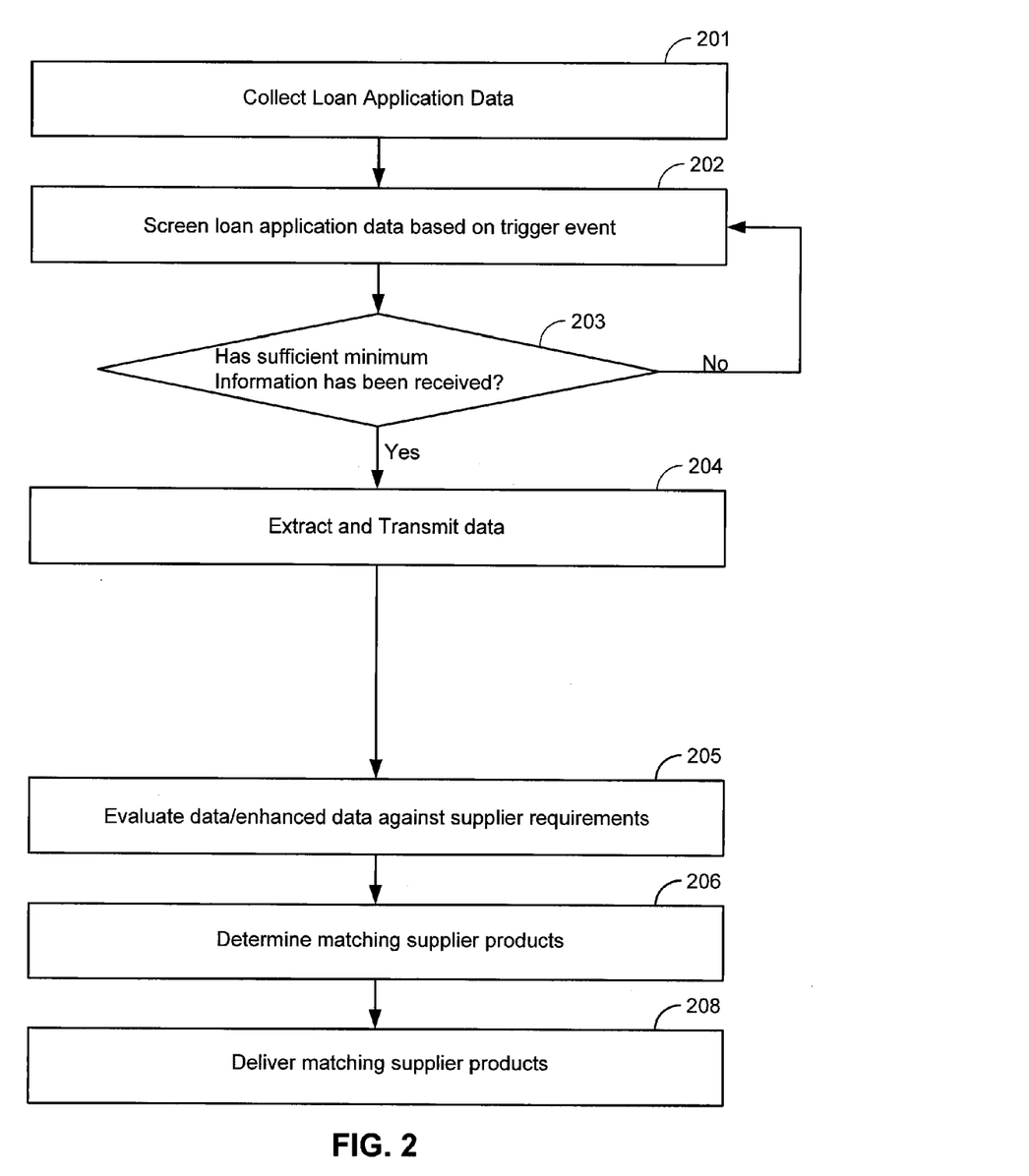
FIG. 2 is a flowchart illustrating a method for screening loan applications.

FIG. 2 illustrates a general process for the loan screening. At step 201, loan application data is collected. For example, during the loan application process, the originator can fill out a borrower summary or loan application for the prospective borrower. The originator can fill in fields contained in the LOS program. Loan originators can execute LOS programs to manage the origination tasks in the loan application process. FIG. 3 illustrates an example LOS interface 301 that can seamlessly integrate the loan screening system with the LOS. The interface 301 shows no evidence that the loan screening system is contained within the client computer, but rather works in the background, and, in one implementation, is embedded in the LOS program.

Figure 4:
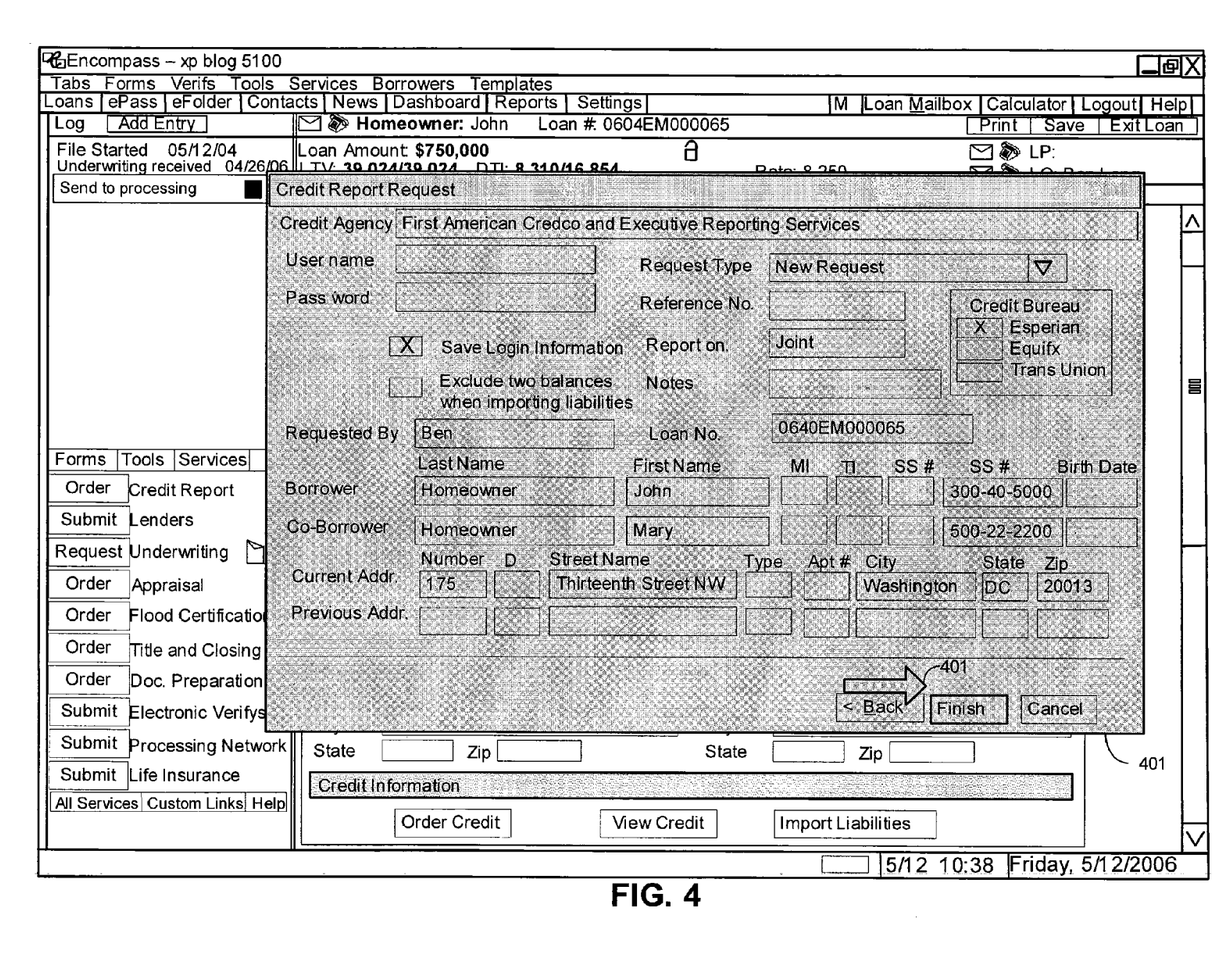
FIG. 4 is an example screen shot of a credit report request interface.

At step 202 screening of application data can be initiated based on a trigger event. For example, the first loan screening module 101 can begin loan screening in real time as soon as certain events occur, such as saving the loan application file, ordering the borrower's credit report, or importing liabilities into the LOS program. The first loan screening module 101 can contain instructions to monitor data entry in real-time, and when the borrower or broker has fulfilled a pre-determined set of conditions, the data is captured and presented to the second loan screening module for comparison against pre-determined criteria for available loan products. In one implementation, the pre-determined set of conditions is whether certain fields have been completed in the loan application 320 shown in FIG. 3. FIG. 3 illustrates an example event initiation interface when the first screening begins, such as after the originator enters borrower information into the loan application 320 and orders credit from, for example, Encompass® (e.g., by selecting a credit order button 310 associated with the event initiation interface). Referring again to FIG. 2, at step 203, application data is evaluated to determine whether certain information or combinations of information have been received. For example, the first loan screening module 101 can determine if pre-determined fields in the loan application 320 have been completed. Such fields may include the borrower name, social security number, loan amount, property value, or any individual or combination of data that is part of the loan application 320. In addition to checking whether certain minimum pre-determined fields have been completed in the loan application 320, the first loan screening module may also apply filters or local validation, perform certain pre-determined actions or may await certain required data before being transmitted for further processing. FIG. 4 shows one example interface presented by the system 100 when the first loan screening module is screening a credit request 401.

As part of step 203, supplier requirements can be identified. Supplier requirements refers to the combination of characteristics of loan application data and other data that will trigger an offer for a promotion by a loan originator. In one implementation, a database of supplier requirements, which may either reside on the client computer with the LOS, or on a server accessible through a network is identified. The supplier requirements database may also be part of either the first or second loan screening modules, or may be part of a database that stores information on supplier products ("supplier products database"). Suppliers are defined as lenders, investors, settlement service providers, or any party that would have an interest in leveraging a loan screen service to target products and offers to originators and borrowers. Supplier requirements may include a set of attributes that can either be fixed, or can be delivered from the supplier through a real-time web interface. If the attributes are fixed, then they may be entered manually, through a user interface, or pulled/pushed periodically from a web interface.

Once the necessary information has been received (e.g., the minimum fields have been filled in), at step 204 of FIG. 2, loan application data can be extracted and transmitted. Extraction can include identifying what combination of information to send, which may or may not be the same as or include the information evaluated in step 203. Transmitting can include transmitting the extracted information locally or remotely. Transmitting can include transmitting the extracted information to another module executing in the same device as the first loan screening module. Alternatively, transmitting can include transmitting the extracted information to another remote module. In some implementations, the second loan screening module might reside on the client where the LOS resides, or may be resident on a server that receives data via the Internet, an intranet, an Ethernet or other data transmission or network connection. This is illustrated in FIG. 1 at 120. In another implementation, both the first and second loan screening modules are accessible via a network, and the entire loan screening service is performed over a network through a website (hosted by the assignee, licensee, "supplier," lender or other authorized company or service).

Figure 5:
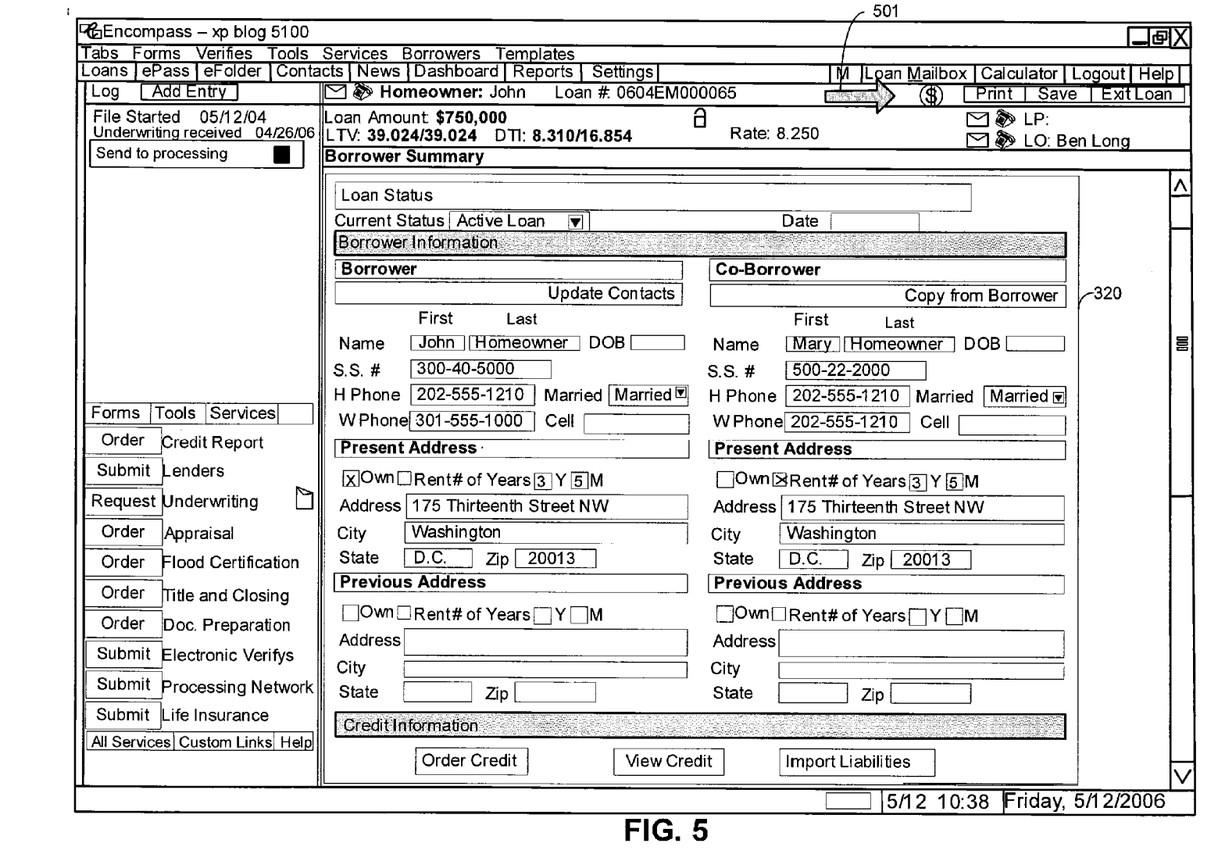
FIG. 5 is an example screen shot showing a visual indication that the first loan screening module has received results from the second loan screening module.

In some implementations, the transmitted loan application data may be augmented with additional third party data to produce an enhanced data set. At step 205, the minimum required loan application data, either augmented with the enhanced data set or by itself, is compared to supplier requirements. In some implementations, the comparison can occur before transmission in step 204. In alternative implementations, the initial screening prior to transmission can be provided to determine candidate loan applications while the second screening after transmission can be used to target particular promotions that may be available to the candidates. For example, the second loan screening module 102 (and in particular loan screening engine 121) can compare transmitted data with or without augmented data to one or more entries in the supplier requirements database 130. Once a match is located, at step 206 supplier products are identified. For example, one or more supplier products that correspond to matching supplier requirements can be determined. Entries in the supplier products database 140 include or have an associated mapping from entries in the supplier requirements database 130. Alternatively, a singular database with single entries including both requirements and products/promotions can be used. Like the supplier requirements database, the supplier products database can reside on the client computer with the LOS, or on a server accessible through a network. The supplier products database can contain promotions that are fixed or dynamically updated with real-time services, such as eligibility and pricing. Relevant matching supplier products, as defined by the supplier requirements and the borrower application data, are then delivered (e.g., by the promotion engine 150 back to the first loan screening module in the originator's LOS program), as shown in step 208 of FIG. 2. FIG. 5 illustrates how, in one implementation, the loan screening system can provide a visual indicator 501 that products/promotions are ready for display. In some implementations, the visual indicator can be of a the form of a list of matches that are presented in a portion of the user interface (e.g., in the lower left had corner of the UI). In some implementations, audio prompts can be provided along with the visual indicator. For example, an audio file can be played (e.g., ka-ching file) when a match is detected signaling to the user the existence of the match.

Figure 6:
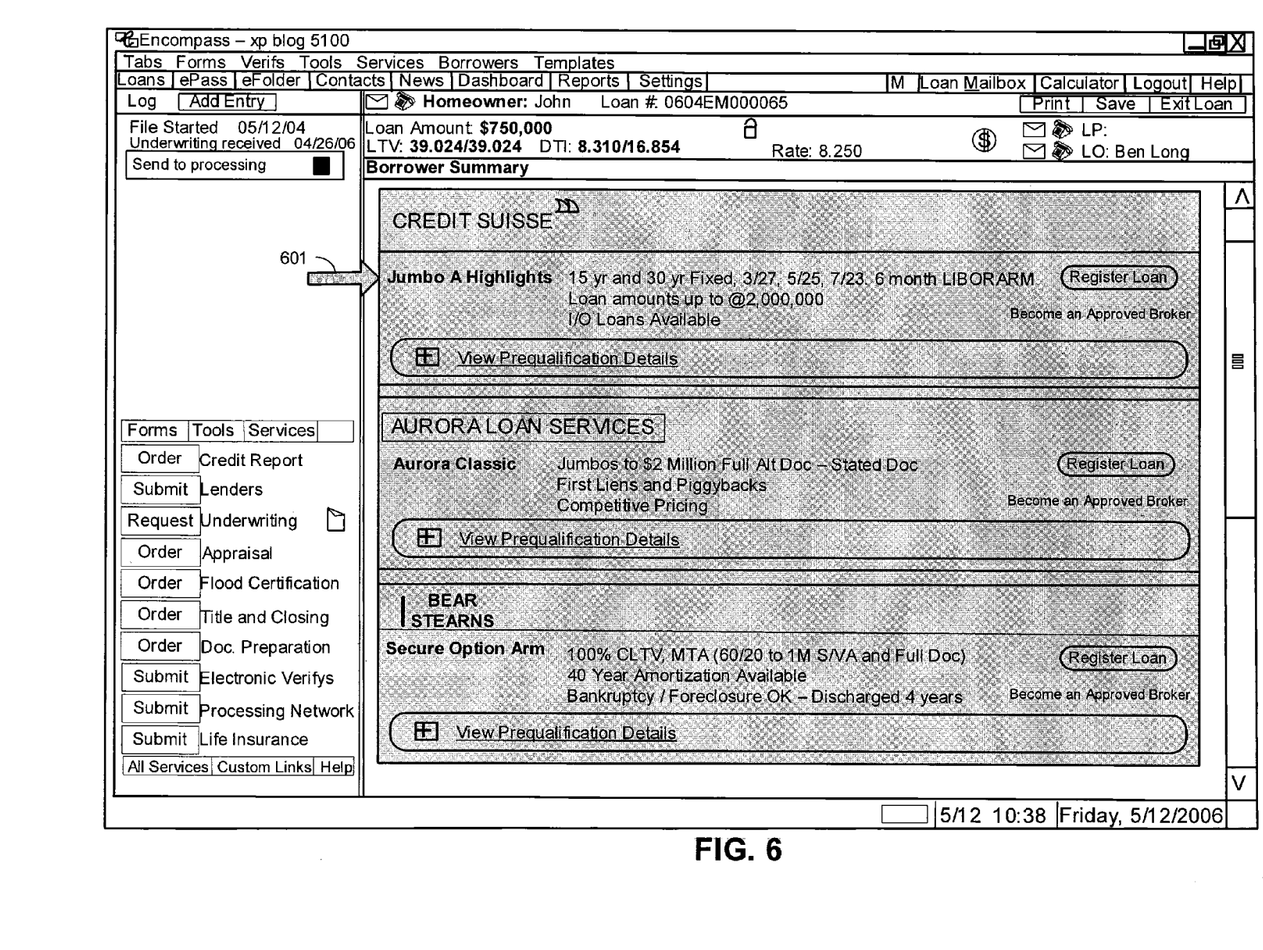
FIG. 6 is an example screen shot displaying multiple loan products returned by the second loan screening module.

Upon delivery of the promotions, the originator can select a chosen product, register the associated loan file and lock in the loan. The originator can also have the ability to manually augment the borrower data set and re-transmit the application to the second loan screening module. FIG. 6 shows an example user interface associated with different products 601 that have been delivered from separate suppliers and concurrently displayed within the LOS window. In the implementation shown, the LOS operator does not have to go outside of the LOS, nor does the LOS operator have to execute the loan screening service if he/she does not want to—the service can be automatic or manually initiated.

Figure 7:
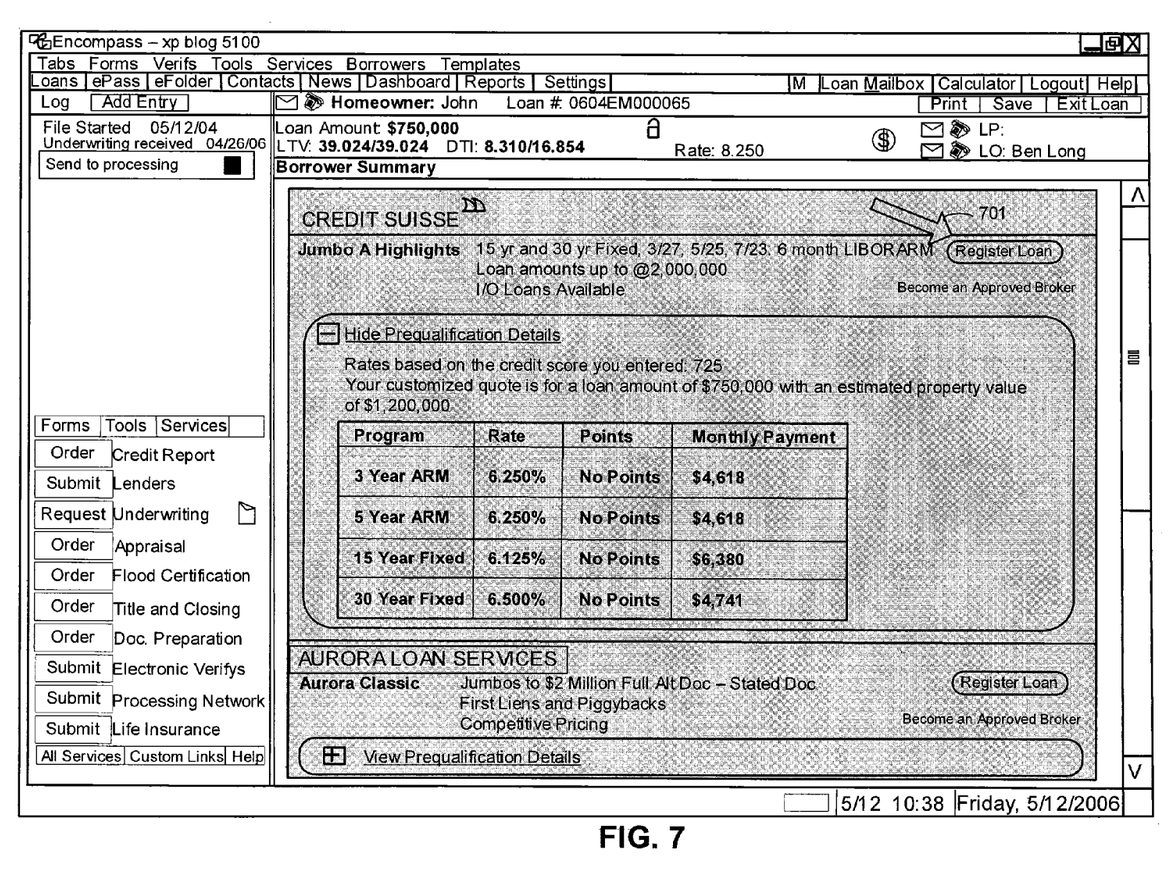
FIG. 7 is an example screen shot showing detailed information about a relevant supplier product.

Other processes for procuring and displaying the matching loans and promotions can also be made available. For example, by clicking on a particular product, the loan screening service can focus on the details of that product. An example user interface associated with a focused product detail is shown in FIG. 7 at 701. This type of configuration can enable the originator to present more in-depth information to the borrower, allowing the borrower to make more informed decisions based upon need, availability of funds, and the information provided. In one implementation, the supplier products require dynamic pricing, which the originator can request, and which can be presented by the loan screening system within the LOS interface.

Figure 8:
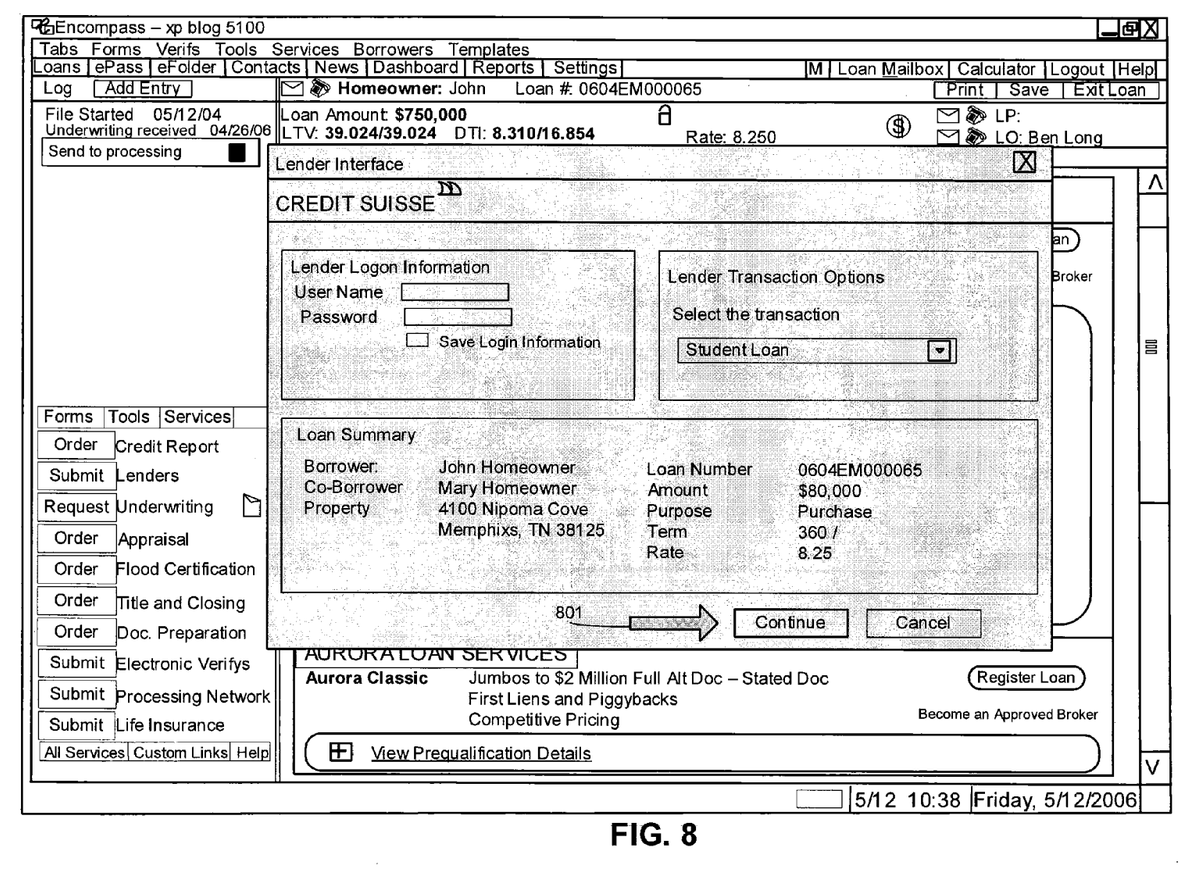
FIG. 8 is an example screen shot showing a transmission between the loan screening system interface and a lender.

As an added feature, the system can enable seamless transmission and interaction with a supplier, all within the LOS program interface. An example user interface is shown in FIG. 8 at 801 which includes an embedded supplier interface within the LOS program. In the example interface, the LOS program gains added usability and the chance of error in transmission is reduced. FIG. 9 shows an example user interface that allows the LOS operator to lock in a loan on behalf of the borrower, all within a single interface.

Although embodiments of the present invention have been described with reference to a network implementation comprising the internet and internet-related web browsing and web serving technologies, it should be noted that alternative embodiments of the present invention can be implemented on many other types of networks and network protocols, such as proprietary protocols for local area networks, wide area networks, and any combination thereof.

The present invention has been described primarily in relation to loan applications for home mortgage loans. One skilled in the relevant art, however, would appreciate that many other types of loans can be processed through the embodiments described herein, such as commercial loans, personal loans, home equity loans, extensions of credit, and the like.

The interfaces illustrated in FIGS. 3-9 are primarily intended for illustration, and that the layout and content of the interfaces served by the system can vary depending upon implementation choices by the lenders and/or loan originators. Furthermore, a wide variety of interfaces can be provided for other aspects of the loan origination process and the links illustrated in the Figures.

In the foregoing, the system has been described for screening, processing and submitting loan application data through an embedded loan origination software program and loan processing interface system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A system comprising:
a supplier requirements database stored in a memory device, the supplier requirements database containing information on one or more pre-determined criteria to match against borrower application data;
an extraction module that:
monitors the borrower application data as the borrower application data is entered against a pre-determined set of conditions,
after a pre-determined event associated with the pre-determined set of conditions and unrelated to a completion of an associated loan application, compares the monitored borrower application data to the pre-determined criteria in the supplier requirements database to determine a match,
extracts at least a portion of the borrower application data based on the match, and
transmits the extracted data to a product identifier;
a supplier products database stored in a memory device, the supplier products database containing information on one or more supplier products; and
a product identifier that evaluates the extracted data received from the extraction module to identify the one or more supplier products stored in the supplier products database, and if a supplier product is identified, transmits the identified supplier product to a client device associated with the extraction module.

2. The system of claim 1 where the extraction module monitors and extracts the borrower application data as the borrower application data is entered.

3. The system of claim 1, wherein the extraction module is embedded in a client application that displays information generated by the product identifier within the client application's user interface.

4. The system of claim 3, wherein the extraction module sends data from the client application over an Internet, intranet or local area network.

5. The system of claim 1, wherein the extraction module and the product identifier are resident on a single computer.

6. The system of claim 1, wherein the extraction module and the product identifier are resident on a server, accessible through a network.

7. The system of claim 1, where:
the extraction module resides on a client computer;
the product identifier resides on a server computer; and
the client computer and the server computer are connected by a network.

8. The system of claim 1, where:
the extraction module resides on a server computer;
the product identifier resides on a client computer; and
the client computer and the server computer are connected by a network.

9. The system of claim 1, where the extraction module and the product identifier reside on a client computer.

10. The system of claim 1, where the extraction module and the product identifier reside on a server computer separate from a client computer that receives borrower application data.

11. The system of claim 1, wherein the one or more supplier products is provided by one or more suppliers selected from a group of suppliers consisting of lender, investor, settlement service provider, investment bank and a party interested in marketing products and services to borrowers.

12. The system of claim 1, wherein the supplier requirements database and the supplier products database are a single database.

13. The system of claim 1, wherein the extraction module further includes an interface embedded within a client application that accesses at least one supplier's website and displays information from at least one supplier's website, the at least one supplier supplying at least one of the one or more supplier products.

14. The system of claim 1, wherein the extraction module includes an interface embedded within a client application that accesses at least one supplier's website and permits selection of a supplier product from at least one supplier's website, the at least one supplier supplying at least one of the one or more supplier products.

15. The system of claim 1, wherein the supplier products database further comprises information on one or more of aggregated loans, pooled-loan backed bonds, fixed-income investments or mortgage-backed securities.

16. A method comprising:
monitoring, by a first processor executing an extraction process, loan application data as the loan application data is entered into a client application by a user against a pre-determined set of conditions, the client application associated with a client computer;
determining, by the first processor, an event associated with the pre-determined set of conditions has occurred, the event unrelated to a completion of an associated loan application;
after the event, comparing, by the first processor, the loan application data to one or more pre-determined criteria to determine a match;
extracting, by the first processor, at least a portion of the loan application data from the monitored data based on the match;
transmitting, by the first processor, the extracted data to a product matching process,
matching, by a second processor executing a matching process, the extracted data against one or more supplier products; and
displaying one or more of the matching supplier products within an interface of the client application as displayed on the client computer.

17. The method of claim 16, wherein the extracting and matching both occur on a same computer.

18. The method of claim 16, wherein extracting is performed on a client computer, the matching is performed on a server computer, the method further comprising:
linking the client computer and server computer.

19. The method of claim 16, wherein the one or more supplier products is provided by one or more suppliers selected from a group of suppliers consisting of lender, investor, settlement service provider, investment bank and a party interested in marketing products and services to borrowers.

20. The method of claim 16, where extracting includes:
accessing at least one supplier's website, the at least one supplier supplying at least one of the one or more supplier products; and
displaying information from at least one supplier's website within the interface of the client application.

21. The method of claim 16, where extracting includes:
accessing at least one supplier's website, the at least one supplier supplying at least one of the one or more supplier products; and
permitting selection of a supplier product from at least one supplier's website within the client application interface.

22. The method of claim 16, where displaying includes communicating with a supplier over an Internet, intranet or local area network, the at least one supplier supplying at least one of the one or more supplier products.

* * * * *